# (12) United States Patent
Duffy et al.

(10) Patent No.: US 10,585,688 B2
(45) Date of Patent: Mar. 10, 2020

(54) SERVICE TICKET GENERATION USING IOT BUTTONS

(71) Applicants: E. Robert Duffy, Norfolk, MA (US); Joshua Schlafer, Rocky Hill, CT (US)

(72) Inventors: E. Robert Duffy, Norfolk, MA (US); Joshua Schlafer, Rocky Hill, CT (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/916,632

(22) Filed: Mar. 9, 2018

(65) Prior Publication Data

US 2019/0278618 A1     Sep. 12, 2019

(51) Int. Cl.
G06F 9/451    (2018.01)
H04L 29/08    (2006.01)
H04L 12/24    (2006.01)

(52) U.S. Cl.
CPC .......... *G06F 9/453* (2018.02); *H04L 41/5074* (2013.01); *H04L 67/10* (2013.01); *H04L 67/18* (2013.01)

(58) Field of Classification Search
None
See application file for complete search history.

(56) References Cited

U.S. PATENT DOCUMENTS

| 2015/0161723 | A1* | 6/2015 | Rose ...................... G06Q 40/02 705/38 |
| 2016/0165460 | A1* | 6/2016 | Mikkelsen ............ H04W 24/02 |
| 2016/0323445 | A1* | 11/2016 | Warren .................. H04W 4/90 |
| 2019/0026635 | A1* | 1/2019 | Wang ....................... G06N 5/04 |
| 2019/0122169 | A1* | 4/2019 | Sonone ............... G06Q 10/087 |

* cited by examiner

*Primary Examiner* — Angela Nguyen
(74) *Attorney, Agent, or Firm* — Hickman Palermo Becker Bingham LLP

(57) ABSTRACT

Techniques are described herein for generating service tickets. Embodiments include receiving first button data from an internet-of-things (IOT) button, the first button data comprising button identification information that uniquely identifies the IOT button and first button state information that specifies a button state, from a plurality of button states, of the IOT button, wherein the first button data corresponds to a first button press of the IOT button. The first button data is processed using a custom function associated with a service provider to cause: determining, based on the button identification information, a service location associated with the first button press; determining, based on the first button state information, a service issue associated with the first button press; and generating a service ticket corresponding to the first button press, wherein the service ticket indicates the service location and the service issue.

20 Claims, 3 Drawing Sheets

SERVICE TICKET GENERATION USING IOT BUTTONS

FIELD OF THE INVENTION

Embodiments relate to generation of service request tickets using internet-of-things buttons. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A service provider provides organizations with services such as consulting, legal, real estate, communications, storage, processing, information technology (IT), and etc. A service provider may provide services to internal and/or external users, business units or groups, business enterprises, and etc. The clients of a service provider may be at various remote locations, and it may be difficult for a service user to submit a service request to the service provider or describe the service issue. For example, a user may email, call, or submit a ticket online. The service provider may need systems and staff to handle phone calls or emails. The staff may need to be trained to walk a user through troubleshooting steps prior to entering a service ticket. Additionally, users may experience wait times due to busy phone lines, email backlogs, or other delays. Several users may also submit service requests for the same issue, which results in inefficiencies such as auditing the service requests, sending multiple personnel to handle the same service issue, and etc.

Therefore, it is desirable and beneficial to provide a system for generating service tickets in an efficient manner.

SUMMARY

According to an embodiment, a method comprises receiving first button data from an internet-of-things (IOT) button, the first button data comprising button identification information that uniquely identifies the IOT button and first button state information that specifies a button state, from a plurality of button states, of the IOT button, wherein the first button data corresponds to a first button press of the IOT button. The first button data is processed using a custom function associated with a service provider to cause: determining, based on the button identification information, a service location associated with the first button press; determining, based on the first button state information, a service issue associated with the first button press; and generating a service ticket corresponding to the first button press, wherein the service ticket indicates the service location and the service issue.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. SYSTEM ARCHITECTURE
III. IOT BUTTON OVERVIEW
IV. CUSTOM FUNCTION OVERVIEW
V. EXAMPLE PROCESS
VI. IMPLEMENTATION EXAMPLES

I. Overview

An approach is provided for generating service tickets at a service provider computer system. A service ticket requests service from the service provider for a particular service issue at a particular service location.

According to the approach, button data corresponding to a button press is received from an internet-of-things (IOT) button. An internet-of-things button is an Internet-connected device comprising at least one button. The IOT button can transmit messages to other IOT devices or computing devices, for example, in response to the button being pressed. The button data may comprise button identification information that uniquely identifies the IOT button and first button state information that specifies a button state, from a plurality of button states, of the IOT button. For example, button data from an IOT button may comprise a serial number of the button and information specifying the type of button press that occurred.

The first button data is processed using a custom function associated with a service provider. Based on the button identification information, a service location associated with the first button press is determined. For example, data may be stored that maps button serial numbers to respective service locations and/or service devices at the respective service locations.

Based on the first button state information, a service issue associated with the first button press is determined. For example, if the button state information includes information specifying the type of button press that occurred, each type of button press may be associated with a particular service issue. Assume the service location is a printer room. A single press may indicate a printer jam, a double press may indicate the printer is out of paper, and a long press may indicate the printer has malfunctioned.

A service ticket is generated corresponding to the button press, wherein the service ticket indicates the service location and the service issue associated with the button press.

II. System Architecture

Figure 1:
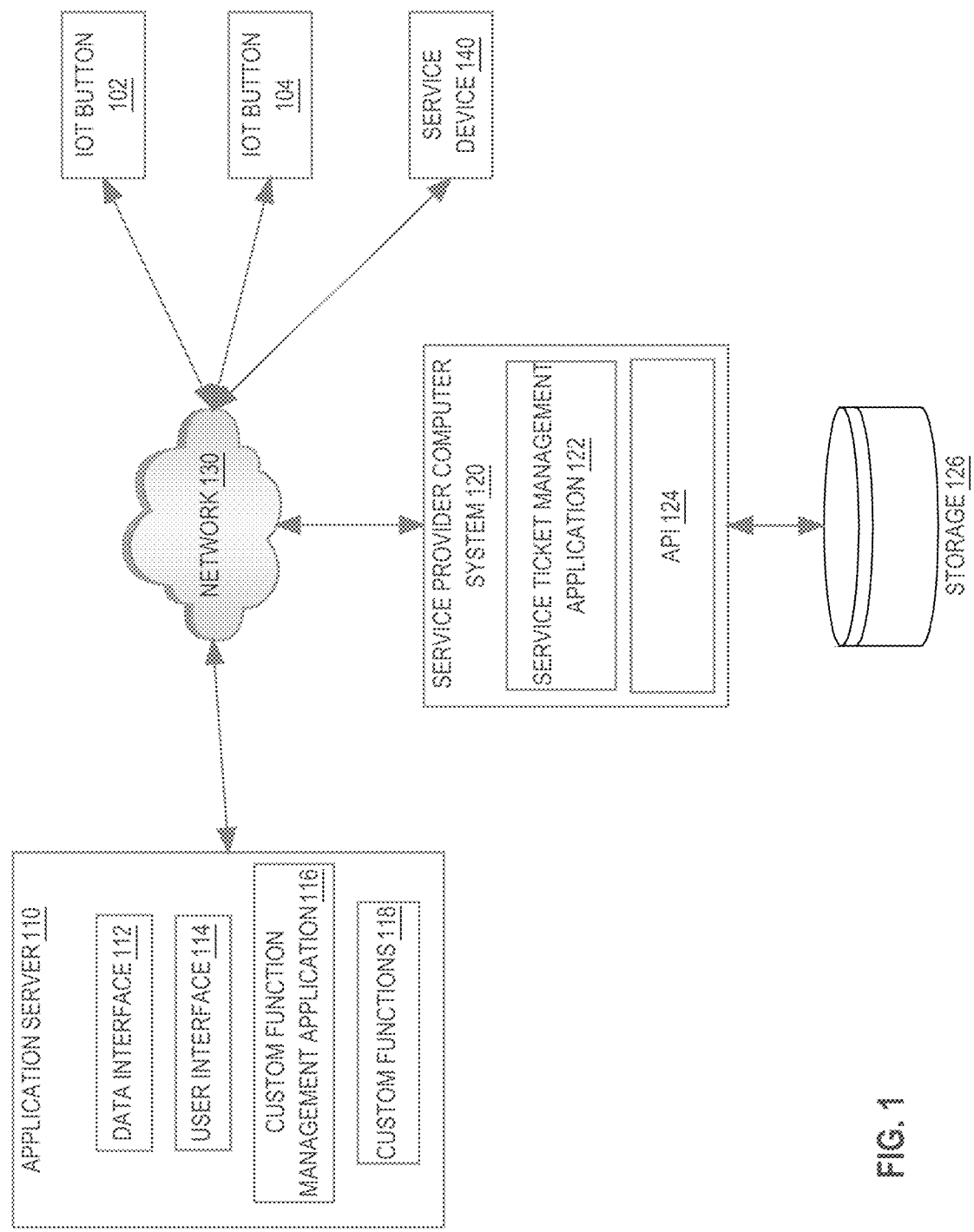
FIG. 1 is a block diagram that depicts an arrangement for generating service tickets using IOT buttons.

FIG. 1 depicts an example computer system that is configured to perform the techniques described herein.

In the example depicted in FIG. 1, application server 110 includes data interface 112, user interface 114, custom function management application 116, and one or more custom functions 118. Application server 110 provides functionality for creating, managing, and executing custom functions. As an example, application server 110 may generate and serve one or more Web pages that provide a user interface for creating and managing the custom functions. Additionally, application server 110 may execute one or more custom functions in response to receiving button press information from an internet-of-things (IOT) buttons 102 and 104.

Application server 110 may include various other components that may vary depending upon a particular implementation and application server 110 is not limited to a particular set of components or features. Application server 110 may include various hardware and software components that may vary depending upon a particular implementation and application server 110 is not limited to any particular hardware and software components.

Data interface 112 is configured to receive data from IOT buttons 102 and 104, and may do so using various communication protocols, such as the Transmission Control Protocol (TCP), the TCP/Internet Protocol (TCP/IP), the Hypertext Transfer Protocol (HTTP), Bluetooth communication protocols, or any other data communications protocol. Data interface 112 may include corresponding elements to support these transport methods.

Data interface 112 is further configured to support the transmission of data from application server 110 to other devices and processes, for example, service provider computer system 120, other computing devices, other services such as the one or more custom functions 118, and etc.

User interface 114 provides a mechanism for a user, such as an administrator, to access application server 110, IOT button identification information stored by application server 110, and/or custom functions managed by application server 110. User interface 114 may be implemented as an API for application server 110. Alternatively, user interface 114 may be implemented by other mechanisms. For example, user interface 114 may be implemented as a Web server that serves Web pages to provide a Web-based user interface for application server 110.

Custom function management application 116 provides functionality for generating, uploading, and/or managing custom functions. Example functionality includes receiving user-defined custom functions, modifying stored custom functions, and associating custom functions with one or more particular IOT buttons.

According to one embodiment, custom function management application 116 provides a graphical user interface to allow user access to the aforementioned functionality. The graphical user interface may be provided by application software on a client device, application software on application server 110 or any combination of application software on a client device and on application server 110. As one example, the graphical user interface may be implemented by one or more Web pages generated on application server 110 and provided to a client device. Custom function management application 116 may be implemented in computer hardware, computer software, or any combination of computer hardware and software. For example, custom function management application 116 may be implemented as an application, e.g., a Web application, executing on application server 110.

In an embodiment, when IOT button data is received at application server 110, the custom function management application determines one or more custom functions associated with the IOT button from which the IOT button data was received, and executes the one or more custom functions. In other embodiments, the determination and execution may be implemented in other applications, software, or modules that are executed by application server 110.

One or more custom functions 118 are managed by custom function management application 116. The one or more custom functions may be user-defined rules or functions that receive IOT button data as input. The one or more custom functions, when executed, perform one or more actions based on the IOT button data. For example, a custom function may be programmed to cause a text message notification to be sent to one or more users, where the text message indicates an IOT button that was pressed. A custom function may also execute other applications on application server 110 or communicate with applications on other servers, for example, using an application programming interface (API). For example, a custom function may use a service provider API to send the IOT button data to service provider computer system 120.

Network 130 may include any number and type of wired or wireless networks, such as local area networks (LANs), wide area networks (WANs), one or more internetworks such as the public the Internet, a cellular network, a company network, or etc. Network 130 may also include one or more computing devices, such as one or more server computers, load-balancing computers, cloud-based computers, data centers, storage devices, and/or any other special-purpose computing devices. The various elements depicted in FIG. 1 may also communicate with each other via direct communications links.

In one embodiment, service provider computer system 120 is any computing device, including but not limited to: servers, racks, work stations, personal computers, general purpose computers, laptops, Internet appliances, wireless devices, wired devices, multi-processor systems, mini-computers, and the like. Although FIG. 1 shows a single element, service provider computer system 120 broadly represents one or more multiple server computers, such as a server cluster, and service provider computer system 120 may be located in one or more physical locations. Furthermore, although embodiments are depicted in the figures and described herein in the context of a single service provider computer system, this is done for explanation purposes only, and embodiments are applicable to any number of service provider computer systems. Each service provider computer system 120 is communicatively connected to application server 110 through network 130.

In the example illustrated in FIG. 1, service provider computer system 120 includes a service ticket management application 122. In an embodiment, service ticket management application provides an API 124 that may be accessed, for example, by one or more custom functions 118 to send IOT button data to the service provider computer system 120 or to cause service ticket management application 122 to generate one or more service tickets.

Service provider computer system 120 may store one or more service tickets in storage 126. Additionally, storage 126 may store data used to generate service tickets, such as data associating button identification information with button locations, data associating button locations and/or button states with service issues, data associating button identification information with service devices, and etc. Storage 126 may include any type of storage, such as volatile memory and/or non-volatile memory, hard drives, etc.

In an embodiment, service provider computer system 120 or application server 110 may communicate with one or more service devices 140. A service device may be a device that requires service, such as a printer, computer, or other electronic device or appliance. Service provider computer system 120 or application server 110 may send commands to a service device 140 to cause it to execute troubleshooting functions.

Additionally, service provider computer system 120 or application server 110 may communicate with other devices located at a service location. For example, a keypad, fingerprint reader, card reader, or other user identification device may send user identification information to service provider computer system 120. The user identification information may indicate a user that pressed an IOT button. The service ticked generated from the button press may be associated with the user that pressed the IOT button. As another example, service provider computer system 120 may communicate with devices such as lights, speakers, display screens, and etc., to indicate that a service ticket for a button press was generated.

Service provider computer system 120 may include other elements, such as one or more input devices, memory, processors, and the like, which are not depicted in FIG. 1 for purposes of explanation. Service provider computer system 120 may also include applications, software, and other executable instructions to facilitate various aspects of embodiments described herein. These applications, software, and other executable instructions may be installed by a user, owner, manufacturer, or other entity related to the service provider computer system.

For the purpose of illustrating a clear example, certain operations, functions, and components are attributed to the application server 110. However, in other embodiments, the same operations, functions and/or components may be implemented separate from application server 110, such as in service provider computer system 120 or another computing device. For example, custom function management application 116 and/or the one or more custom functions 118 may be implemented on service provider computer system 120.

Additionally or alternatively, operations, functions and/or components attributed to service provider computer system 120 may be implemented in application server 110. For example, application server 110 may include service ticket management application 122. In some embodiments, service provider computer system 120 comprises application server 110.

III. IOT Button Overview

An internet-of-things button is an Internet-connected device that can transmit messages to other IOT devices or computing devices. In the example illustrated in FIG. 1, IOT button 102 and IOT button 104 are connected to application server 110 and service provider computer system 120 via network 130. In an embodiment, an IOT button is programmed or configured to communicate with one or more particular computing devices. For example, IOT button 102 may be configured to communicate with application server 110. In an embodiment, an IOT button may be configured to communicate with the one or more particular computing devices using an encrypted connection.

In some embodiments, application server 110 may be programmed or configured to receive data only from one or more particular IOT buttons. The one or more particular IOT buttons may be registered with application server 110. Only button data received from registered IOT buttons may be processed. For example, IOT button 102 may be registered with application server 110 while IOT button 104 is not registered with application server 110. Thus, application server 110 processes communications from IOT button 102, but not IOT button 104.

In an embodiment, an IOT button is configured to communicate with application server 110 using a device certificate, such as a Secure Sockets Layer (SSL) certificate. A device certificate may be registered with application server 110 in association with one or more IOT buttons. The one or more IOT buttons use the device certificate to communicate with application server 110. Additionally, application server 110 may reject communications from IOT buttons that do not include a device certificate or whose device certificates are not registered with application server 110. In some embodiments, a device certificate may be unique to a particular IOT button. For example IOT button 102 may be associated with a first device certificate and IOT button 104 may be associated with a second device certificate that is different from the first device certificate.

In an embodiment, application server 110 receives and processes IOT button data for a plurality of users. Each user may be associated with a respective set of one or more IOT buttons. The application server 110 may determine whether button data was received from an IOT button that is associated with at least one user, and process button data only if it was received from an IOT button that is associated with a user. In an embodiment, each user is associated with one or more device certificates corresponding to the set of one or more IOT buttons associated with the user. Additionally, a user may manage the device certificates associated with the user. The user may create device certificates, associate device certificates with particular IOT buttons, disassociate device certificates with particular IOT buttons, and delete or revoke device certificates. If a device certificate is removed from an IOT button, the IOT button is unable to communicate with the application server 110. Similarly, if a device certificate is revoked, an IOT button using the removed device certificate is unable to communicate with the application server 110.

In an embodiment, an IOT button transmits IOT button data. The IOT button data may comprise an IOT button identifier that uniquely identifies the IOT button. For example, the button identifier may be a serial number associated with the IOT button. The IOT button data may also comprise button state information indicating the button state. The button state information may include, for example, one or more of: battery information, device status, timestamp, and etc.

In an embodiment, the button state information comprises information indicating a type of button press used to press the IOT button. Types of button presses include, for example, single presses, multiple presses, such as double presses, triple presses, etc., and long (held down) presses. Button presses may also include series of presses, for example, a single press, followed by a double press, as well as combinations of presses and long presses. In certain implementations, this allows more actions to be represented by button presses.

In an embodiment, an IOT button includes a single button and no additional user interaction elements. In other embodiments, the IOT button may include multiple buttons. The button state information may indicate which button(s) were pressed, in addition to the type of press that was used for each button. Additionally or alternatively, the IOT button may include other user interaction elements, such as one or more indicators such as lights or display screens, switches, dials, sliders, balls, fingerprint readers, etc. The indicators may be used, for example, to indicate that button press data was received by application server 110, or that a service ticket was generated at service provider computer system 120.

IV. Custom Function Overview

In an embodiment, a custom function is a set of rules or program instructions that are performed or executed in response to receiving button data from an IOT button. The custom function may cause one or more actions to be performed based on the IOT button data. Each custom function may be associated with one or more particular IOT buttons. Additionally, each IOT button may be associated with one or more custom functions.

In an embodiment, the application server stores data associating IOT buttons with custom functions. When the application server receives button data from an IOT button, it determines one or more particular custom functions associated with the IOT button, and invokes the one or more particular custom functions.

One or more portions of the button data may be passed to the custom function as a parameter or as input. Alternately, all of the button data may be sent to a custom function, but the custom function may utilize only a portion of the button data.

In an embodiment, the custom function includes sending a message to an external device. For example, the custom function may cause a text message or an email to a user that pressed the IOT button. Additionally or alternatively, the custom function may include API calls for interacting with or receiving data from an external device other than the IOT button. For example, the custom function may cause a device at a service location to indicate that a service ticket has been generated, such as display a notification on a display screen, flashing or turning on a light at the service location, playing a sound on a speaker, and etc. As another example, the custom function may cause a service device to generate and send a log file, or execute one or more troubleshooting functions, such as rebooting. The custom function may request user identification information from a keypad, fingerprint reader, card reader, or other user identification device at the service location. The user identification information may be processed to indicate which user pressed the IOT button.

In an embodiment, the custom function may include one or more API calls for interacting with service provider computer system 120. The custom function may use the one or more API calls to process the button data. For example, API calls may be used to determine a service location and/or a service issue. As another example, an API call may be used to send the button data to service provider computer system 120. In addition, user identification information and/or service device information (such as a log file) may be retrieved as described above and sent to the service provider computer system 120.

Code snippet 1 depicts a portion of an example custom function. Assume "event" is a data object storing IOT button data, and "sp" is a data object for sending requests to a service provider computer system.

Code Snippet 1:

```
sp = serviceprovider.getSP( )
def event_handler(event, context) :
    sp.createTicket(event.serialNumber, event.clickType)
```

In the illustrated snippet, a ticket creation function is called, which sends a ticket generation request to the service provider computer system. The request parameters comprise an IOT button serial number and a button press type. In response to receiving the request, the service provider computer system may process the serial number and button press type to generate a corresponding service ticket.

V. Example Process

Figure 2:
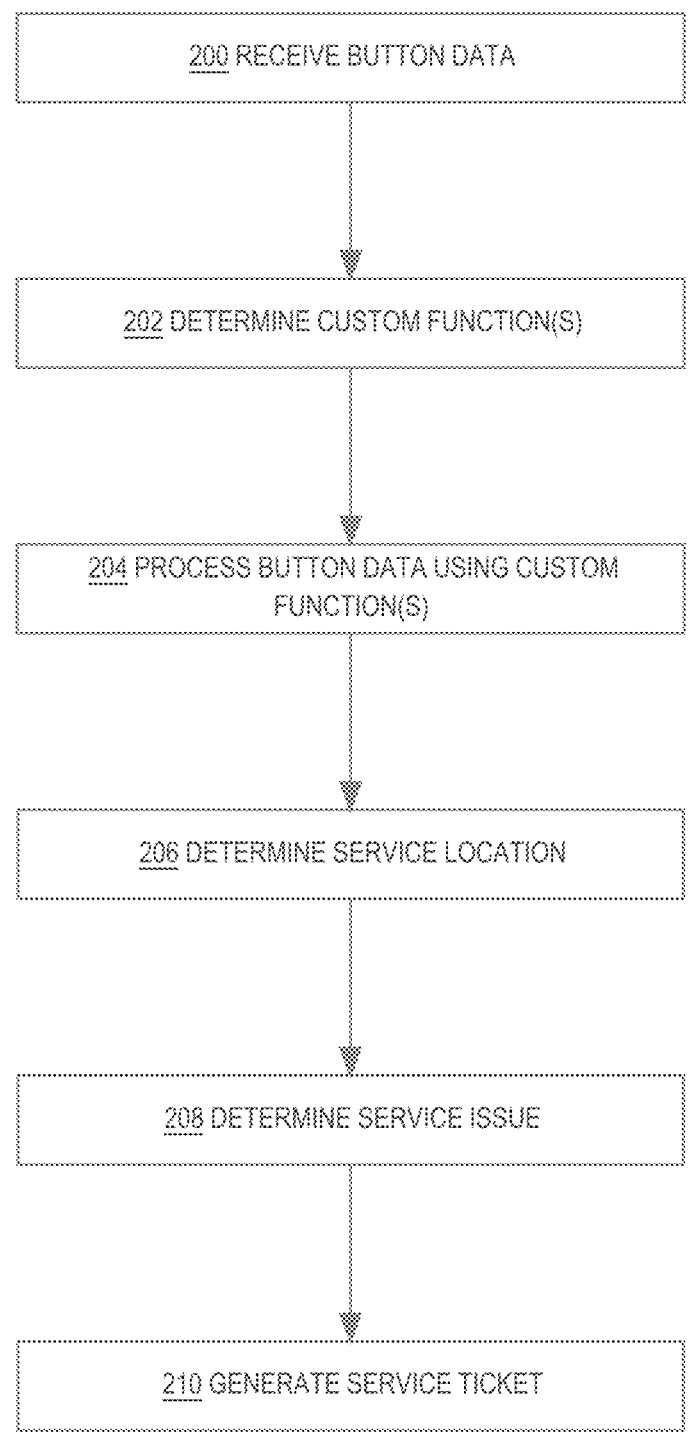
FIG. 2 is a flow diagram that depicts an approach for generating a service ticket from IOT button data.

FIG. 2 depicts example steps for generating a service request ticket based on button data.

At step 200, button data is received from a particular IOT button. The button data may comprise button identification information uniquely identifying the particular IOT button, and button state information specifying a button state from a plurality of button states. For example, the button state information may indicate the type of button press that was used to press the particular IOT button.

At step 202, one or more custom functions associated with the particular IOT button are determined. For example, application server 110 may store data, such as mapping data, associating IOT buttons with custom functions, or vice versa.

At step 204, the button data is processed using each of the one or more custom functions. For the purpose of illustrating a clear example, assume a particular custom function, when executed, causes performance of steps 206 through 210. Each of steps 206-210 may be performed by the application server 110 or service provider computer system 120, depending on the implementation. In an embodiment, the custom function may include instructions which, when executed, cause performance of the steps described below. In other embodiments, the custom function may send instructions to service provider computer system 120 that cause service provider computer system 120 to perform the steps described below.

Alternately, the custom function may send the button data to service provider computer system 120, and service provider computer system 120 may execute instructions which cause performance of the steps described below. For example, the custom function may send the button identification information and button state information to service provider computer system 120. In response to receiving the button identification and button state information, service provider computer system 120 processes the button data to generate a support ticket corresponding to the button press.

At step 206, a service location is determined based on the button identification information. A service location may correspond to a physical location, such as an address, building, room, or office desk. Additionally or alternatively, a service location may correspond to a particular service device, such as a printer, fax machine, computer or laptop, monitor, and etc. Additionally or alternatively, a service location may correspond to a particular user and/or business enterprise of a plurality of users and/or business enterprises. For an example, a service location may correspond to a particular printer room of a particular office building for a particular business enterprise. One or more of physical location, service device, user, or business enterprise may be determined based on the button identification information.

In an embodiment, data is stored that maps button identification information to service locations. The service location corresponding to the button identification information may be retrieved. For example, a particular button serial number may be mapped to a particular service device of a particular business enterprise. In addition, data may be stored that indicates the location of the service device, the type of service device, or other service device information. The data may be stored at the service provider computer system 120, such as in storage 126, at the application server 110, or other storage location.

In other embodiments, the button identification information may comprise service location information. For example, the button identification information may comprise an address at which the IOT button is located.

In the present example, assume the button identification information is a unique button serial number, and the serial number is mapped to a particular print room. The service location is the location of the particular print room.

At step 208, a service issue is determined based on the button state information. In an embodiment, the button state may be a particular button state of a plurality of possible button states. Each possible button state may be associated with a particular service issue. For example, assume the plurality of button states are button press types. A single press may correspond to a first service issue, a double press may correspond to a second service issue, and a long press may correspond to a third service issue.

Additionally or alternatively, the particular service issue associated with a button state may depend on the service location, service device, and/or associated user. As an example, for a printer room, a single press may correspond to a printer jam, while for a cubicle, a single press may correspond to a desktop hardware issue. The service issues that correspond to the different button states may be configured for each service location. Data may be stored that maps service locations to service issues for each button state.

In the present example, assume the button state information indicates that the button press was a long press, and that the long press corresponds to a toner replacement service issue.

At step 210, a service ticket corresponding to the service location and the service issue is generated at the service provider computer system 120. For example, a service ticket is generated indicating that the particular print room requires a toner replacement. The service ticket may be stored in storage 126.

In an embodiment, the service ticket may be generated at or forwarded to a particular endpoint of a plurality of endpoints. For example, the service provider may include a plurality of service departments. Based on the service location and/or service issue, a particular service department may be selected for servicing the request. The service ticket may be generated at an endpoint corresponding to the particular service department. Alternately, a generated service ticket may be assigned to the particular service department.

In an embodiment, if the service location and service issue correspond to a pre-existing service ticket, then the service ticket may not be generated. The determination may be based on the amount of time between the button press and the time at which the pre-existing service ticket was generated. For example, the service provider computer system may limit the number of tickets for the same service location and the same service issue to one service ticket per day.

In an embodiment, if the service location corresponds to a pre-existing service ticket but the service issue is different, the service issue may be added to the pre-existing service ticket. Alternately, a new service ticket may be generated and both service tickets may be assigned to the same service technician.

In an embodiment, the service ticket may be associated with a priority level. The priority level may be based on the service location and/or the service issue. For example, particular service issues may automatically be assigned a higher priority level. In an embodiment, the priority level of a particular service ticket may be increased if multiple button presses correspond to the same service location and the same service issue as the particular service ticket. Whether to increase the priority may depend on one or more of: the number of button presses received within a period of time that correspond to the same service location and service issue; the amount of time between button presses that correspond to the same service location and service issue; and whether the service ticket has been addressed by a service technician. For example, if three button presses occur within a period of half an hour, rather than submitting three service tickets, the priority level of the first service ticket may be increased.

In an embodiment, subsequent button presses may be used to provide additional information for the service ticket. A subsequent button press may have to occur within a particular amount of time, such as within a minute of a first button press. As an example, based on button data from a first button press, a particular service device may be determined. Based on button data from a second button press, a particular service issue for the particular service device may be determined.

In an embodiment, after a service ticket is generated, feedback is provided to a user indicating that the service ticket was generated. For example, an email or text message may be sent to a particular user based on user identification information or if the particular user is associated with the particular IOT button. As another example, an instruction may be sent to the IOT button and/or another device at the service location, causing the IOT button and/or the other device to indicate that a service ticket was generated.

In an embodiment, based on the service issue, instructions may be sent to the service device to cause the service device to perform one or more troubleshooting functions. For example, the service device may be rebooted; one or more settings, services, or components of the service device may be reset; or one or more pre-programmed diagnostic functions may be executed. Additionally or alternatively, the service device may generate a service log and send the service log to the service provider computer system and/or the application server. The service log may indicate device status, error codes, or other information that may be used to troubleshoot the device. The service log may be associated with the generated service ticket.

VI. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
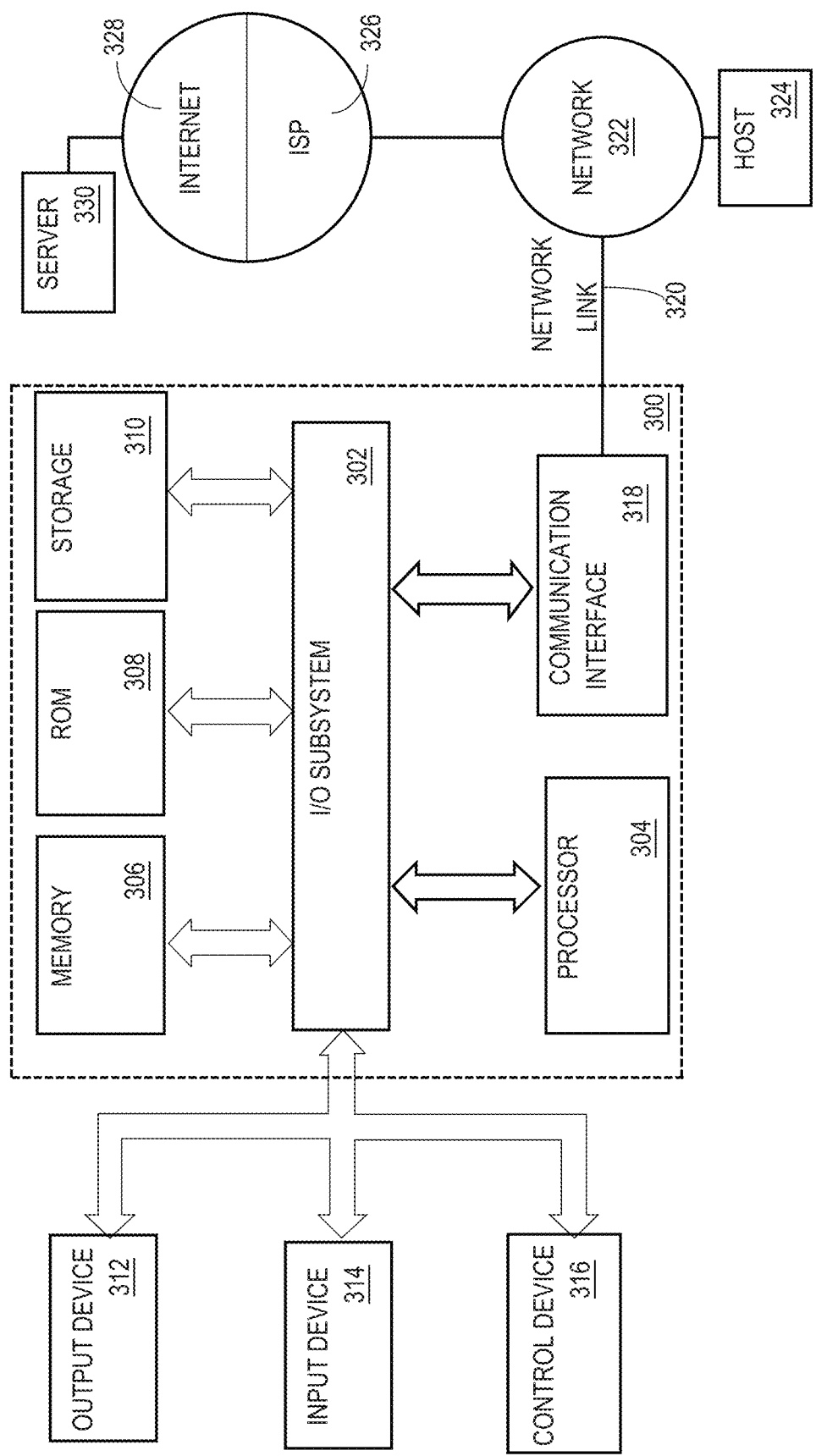
FIG. 3 is a block diagram that depicts an example computer system upon which embodiments may be implemented.

FIG. 3 is a block diagram that depicts an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 314 may include a combination of multiple different input devices, such as a video camera and a depth sensor.

In another embodiment, computer system 300 may comprise an internet-of-things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving first button data from an internet-of-things (IOT) button, the first button data comprising an IOT button identifier that uniquely identifies the IOT button and first button state information, wherein the first button data corresponds to a first button press of the IOT button, and wherein the first button state information indicates at least a type of button press used for the first button press;
    processing the first button data using a custom function associated with a service provider to cause:
        determining, based on the IOT button identifier, a service location associated with the first button press;
        determining, based on the first button state information, a service issue associated with the first button press;
        causing to be generated, at a computer system of the service provider, a service ticket corresponding to the first button press, wherein the service ticket indicates the service location and the service issue.

2. The method of claim 1 further comprising:
    determining that the IOT button is associated with a particular business enterprise of a plurality of business enterprises serviced by the service provider;
    wherein the service ticket further indicates the particular business enterprise.

3. The method of claim 1 further comprising providing feedback to a user that pressed the IOT button, the feedback indicating the service ticket was generated.

4. The method of claim 3 wherein providing the feedback to the user comprises one or more of:
    causing the IOT button to indicate the service ticket was generated, or
    causing a device at the service location to indicate the service ticket was generated.

5. The method of claim 1, the method further comprising:
    receiving identification data corresponding to a user that pressed the IOT button;
    wherein the service ticket further indicates the user that pressed the IOT button.

6. The method of claim 1 wherein the first button data is received at a first time, and wherein the service ticket is associated with a priority level, the method further comprising:
    receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;
    processing the second button data using the custom function to cause:
        determining, based on the IOT button identifier and the second button state information of the second button data, that a service location and a service issue associated with the second button press is the same as the service location and the service issue of the service ticket;
determining whether to escalate the priority level associated with the service ticket based on one or more of:
an amount of time between the first time and the second time, and
on a number of additional button presses received between the first time and the second time, wherein each additional button press corresponds to a service location and a service issue that is the same as the service location and the service issue of the service ticket;
in response to determining to escalate the priority level associated with the service ticket, escalating the priority level associated with the service ticket.

7. The method of claim 1 wherein the first button data is received at a first time, the method further comprising:
receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;
processing the second button data using the custom function to cause:
determining, based on the IOT button identifier of the second button press, that the service location associated with the second button press is the service location associated with the first button press;
determining, based on the second button state information, a second service issue associated with the second button press is different from the service issue associated with the first button press;
generating, at a computer system of the service provider, a service ticket corresponding to the second button press, wherein the service ticket corresponding to the second button press indicates the service location and the second service issue associated with the second button press.

8. The method of claim 1 wherein the first button data is received at a first time, the method further comprising:
receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;
wherein the second time is close in time to the first time;
processing the second button data using the custom function to cause:
determining, based on the IOT button identifier of the second button press, that the service location associated with the second button press is the service location associated with the first button press;
determining, based on the second button state information, one or more service issue details associated with the service issue;
associating the one or more service issue details with the service ticket.

9. The method of claim 1 wherein the service issue is associated with a service device at the service location, the method further comprising one or more of:
causing the service device to generate a service log and send the service log to the service provider computer system, or
based on the service issue, causing the service device to perform one or more troubleshooting functions.

10. The method of claim 1 wherein the computer system of the service provider includes a plurality of endpoints, the method further comprising:
based on the first button data, sending the service ticket to a particular endpoint of the plurality of endpoints.

11. A system for generating a service ticket, the system comprising:
one or more processors;
a non-transitory computer-readable medium storing instructions which, when executed by the one or more processors cause:
receiving first button data from an internet-of-things (IOT) button, the first button data comprising an IOT button identifier that uniquely identifies the IOT button and first button state information, wherein the first button data corresponds to a first button press of the IOT button, and wherein the first button state information indicates at least a type of button press used for the first button press;
processing the first button data using a custom function associated with a service provider to cause:
determining, based on the IOT button identifier, a service location associated with the first button press;
determining, based on the first button state information, a service issue associated with the first button press;
causing to be generated, at a computer system of the service provider, a service ticket corresponding to the first button press, wherein the service ticket indicates the service location and the service issue.

12. The system of claim 11, further comprising instructions which, when executed by the one or more processors, cause:
determining that the IOT button is associated with a particular business enterprise of a plurality of business enterprises serviced by the service provider;
wherein the service ticket further indicates the particular business enterprise.

13. The system of claim 11 further comprising instructions which, when executed by the one or more processors, cause providing feedback to a user that pressed the IOT button, the feedback indicating the service ticket was generated.

14. The system of claim 11 further comprising instructions which, when executed by the one or more processors, cause:
receiving identification data corresponding to a user that pressed the IOT button;
wherein the service ticket further indicates the user that pressed the IOT button.

15. The system of claim 11 wherein the first button data is received at a first time, and wherein the service ticket is associated with a priority level, the system further comprising instructions which, when executed by the one or more processors, cause:
receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;

processing the second button data using the custom function to cause:

determining, based on the IOT button identifier and the second button state information of the second button data, that a service location and a service issue associated with the second button press is the same as the service location and the service issue of the service ticket;

determining whether to escalate the priority level associated with the service ticket based on one or more of:
an amount of time between the first time and the second time, and
on a number of additional button presses received between the first time and the second time, wherein each additional button press corresponds to a service location and a service issue that is the same as the service location and the service issue of the service ticket;

in response to determining to escalate the priority level associated with the service ticket, escalating the priority level associated with the service ticket.

16. The system of claim 11 wherein the first button data is received at a first time, the system further comprising instructions which, when executed by the one or more processors, cause:

receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;

processing the second button data using the custom function to cause:

determining, based on the IOT button identifier of the second button press, that the service location associated with the second button press is the service location associated with the first button press;

determining, based on the second button state information, a second service issue associated with the second button press is different from the service issue associated with the first button press;

generating, at a computer system of the service provider, a service ticket corresponding to the second button press, wherein the service ticket corresponding to the second button press indicates the service location and the second service issue associated with the second button press.

17. The system of claim 11 wherein the first button data is received at a first time, the system further comprising instructions which, when executed by the one or more processors, cause:

receiving, at a second time, second button data from the IOT button, the second button data comprising the IOT button identifier and second button state information, and the second button data corresponding to a second button press of the IOT button, wherein the second press of the IOT button is different than the first press of the IOT button, wherein the second button state information indicates at least a type of button press used for the second button press;

wherein the second time is close in time to the first time;

processing the second button data using the custom function to cause:

determining, based on the IOT button identifier of the second button press, that the service location associated with the second button press is the service location associated with the first button press;

determining, based on the second button state information, one or more service issue details associated with the service issue;

associating the one or more service issue details with the service ticket.

18. The system of claim 11 wherein the service issue is associated with a service device at the service location, the system further comprising instructions which, when executed by the one or more processors, cause one or more of:

causing the service device to generate a service log and send the service log to the service provider computer system, or based on the service issue, causing the service device to perform one or more troubleshooting functions.

19. The system of claim 11 wherein the computer system of the service provider includes a plurality of endpoints, the system further comprising instructions which, when executed by the one or more processors, cause:

based on the first button data, sending the service ticket to a particular endpoint of the plurality of endpoints.

20. The system of claim 13 wherein providing the feedback to the user comprises one or more of:

causing the IOT button to indicate the service ticket was generated, or causing a device at the service location to indicate the service ticket was generated.

* * * * *